US007065158B2

(12) United States Patent
Awater et al.

(10) Patent No.: US 7,065,158 B2
(45) Date of Patent: Jun. 20, 2006

(54) DETECTION METHOD FOR PHASE-MODULATED SYMBOLS WITH A CORRELATOR-BANK

(75) Inventors: Geert Arnout Awater, Utrecht (NL); Robert John Kopmeiners, Hengelo (NL); Didier Johannes Richard Van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 337 days.

(21) Appl. No.: 09/989,052

(22) Filed: Nov. 20, 2001

(65) Prior Publication Data

US 2003/0152168 A1    Aug. 14, 2003

(30) Foreign Application Priority Data

Nov. 20, 2000    (EP) ................................ 00310290

(51) Int. Cl.
*H04L 27/04* (2006.01)
*H04L 27/02* (2006.01)
*H04L 27/36* (2006.01)
*H04L 27/34* (2006.01)
*H03K 9/10* (2006.01)

(52) U.S. Cl. ........................ 375/322; 375/329; 375/343
(58) Field of Classification Search ................ 375/147, 375/208, 340, 142, 260; 714/752; 343/17.2 R; 370/342
See application file for complete search history.

(56) References Cited

U.S. PATENT DOCUMENTS

| 5,602,833 | A * | 2/1997 | Zehavi | 370/209 |
| 6,198,763 | B1 * | 3/2001 | Inoue et al. | 375/130 |
| 6,282,228 | B1 * | 8/2001 | Monroe | 375/140 |
| 6,693,954 | B1 * | 2/2004 | King et al. | 375/147 |
| 2002/0057664 | A1 * | 5/2002 | Sarkar | 370/342 |
| 2002/0122466 | A1 * | 9/2002 | Somayazulu | 375/142 |
| 2002/0124036 | A1 * | 9/2002 | Rawlins et al. | 708/422 |

FOREIGN PATENT DOCUMENTS

EP    0952678    10/1999

OTHER PUBLICATIONS

"Part II Wireless LAN Medium Access Control (MAC) and Physical Layer (PHY) specifications: Higher-Speed Physical Layer Extentin in the 2.4 GHz Band"□□IEEE Std. 802.11b-1999, Jan. 20, 2000, pp. 43-45 XP002166709.*
Carl Andren et al., "CCK Modulation Delivers 11 MBPS for High Rate IEEE 802.11 Extension", Mar. 14, 2000, XP-002147321.

(Continued)

*Primary Examiner*—Dac Ha
*Assistant Examiner*—Linda Wong

(57) ABSTRACT

Detection of a symbol from a received signal wherein the symbol is a selected symbol out of a predetermined set of symbols, wherein each symbol of the predetermined set is a complementary coded keying (CCK) symbol having a sequence of chips wherein each of the chips is phase shift keying (PSK)-modulated according to a selected modulation code wherein each of the selected modulation codes has a first sub-modulation code which is a selection from a plurality of first sets of predetermined phase modulating elements and a second sub-modulation code which is a selection from one second set of predetermined phase modulating elements wherein at least one of the predetermined phase modulating elements of the second set is a complex value such as defined in the high speed IEEE 802.11b standard, wherein a modulation code is selected from the modulation codes which correlates according to a correlation method with the received signal.

24 Claims, 2 Drawing Sheets

OTHER PUBLICATIONS

"Part 11 Wireless LAN Medium Access Control (MAC) and Physical Layer (PHY) specifications: Higher-Speed Physical Layer Extension n the 2.4 GHz Band", IEEE Std 802.11B-1999, Jan. 20, 2000, pp. 42-48, XP002166709.

* cited by examiner

DETECTION METHOD FOR PHASE-MODULATED SYMBOLS WITH A CORRELATOR-BANK

CROSS-REFERENCE TO RELATED APPLICATION

This application claims priority of European Patent Application No. 00310290.2, which was filed on Nov. 20, 2000.

FIELD OF THE INVENTION

The invention relates to a method for the detection of a symbol from a received signal wherein the symbol is a selected symbol out of a predetermined set of symbols, wherein each symbol of the predetermined set is a CCK symbol comprising a sequence of chips wherein each of the chips is PSK-modulated according to a selected modulation code wherein each of the selected modulation codes comprises a first sub-modulation code which is a selection from a plurality of first sets of predetermined phase modulating elements and a second sub-modulation code which is a selection from one second set of predetermined phase modulating elements wherein at least one of said predetermined phase modulating elements of said second set is a complex value such as defined in the high speed IEEE 802.11b standard, wherein a modulation code is selected from said modulation codes which correlates according to a correlation method with the received signal.

The invention relates to a method for the detection of a symbol from a received signal wherein the symbol is a selected symbol out of a predetermined set of symbols, wherein each symbol of the predetermined set is a complementary coded keying (CCK) symbol comprising a sequence of chips wherein each of the chips is phase shift keying (PSK)-modulated according to a selected modulation code wherein each of the selected modulation codes comprises a first sub-modulation code which is a selection from a plurality of first sets of predetermined phase modulating elements and a second sub-modulation code which is a selection from one second set of predetermined phase modulating elements wherein at least one of said predetermined phase modulating elements of said second set is a complex value such as defined in the high speed IEEE 802.11b standard, wherein a modulation code is selected from said modulation codes which correlates according to a correlation method with the received signal.

BACKGROUND OF THE INVENTION

Methods and apparatus of this type are known in practice. Usually methods and apparatus of this type use a bank of correlators which is employed in the receiver. On the basis of the correlation results with the received signal, which is performed in the bank of correlators, the symbol of the received signal can be detected. For this detection the output of each correlator is the input argument of a mathematical function. The mathematical function is maximum for the correlator corresponding to the maximum function. According to said method and apparatus, which uses a pre-determined set of symbols, the symbol detection can be performed in such a way that it minimizes sensitivity to noise in the received signal. Examples of possible pre-determined sets of symbols are given in the high speed standard in the IEEE 802.11b standard. This IEEE 802.11b standard is especially meant for the 2.4 [GHz] band, also called Industrial Scientific Medical Band (ISMB-band), in the United States. It is noticed that corresponding bands are available in most other regions in the world. Users have free access to the ISMB-band if they comply with the standards of the standard proposal. A first important issue of the standard proposal is that the each used symbol has a relatively flat frequency power spectrum, which minimises risks of jamming fellow-users. A second important issue of the IEEE 802.11b standard is that not all possible symbols in the pre-determined set of symbols are used. This results in a redundant and robust detection mechanism.

A first disadvantage of the known methods and apparatus for the detection of a symbol of a received signal is the large number of correlators which are used in the correlator-bank. A second disadvantage of the type of known methods and apparatus is the large processing power which is required for performing the mathematical function, which function is used for the selection of a correlator in the correlator-bank, and operates on the complex output of each of the correlators. This mathematical function normally calculates the length of complex input argument, which leads to at least two multiplications per correlator. In order to reduce the processing power several approximations of said mathematical function have been proposed. However, these approximations only yields sub-optimal detection performance.

SUMMARY OF THE INVENTION

Certain embodiments of the invention realize a reduction of the number of correlators in the correlation-bank. Certain embodiments of the invention reduce the required processing power for the evaluation of said mathematical function. Furthermore certain embodiments of the invention obtain an optimal detection performance. More in particular certain embodiments of the invention offer a detection method which, despite the reduction in the number of correlators and the reduction in the required processing power of the mathematical function, yields the performance of a maximum likelihood detection method. Finally, certain embodiments of the invention seek a method having the advantages stated above which can be used for receive-signals which comply with IEEE 802.11. For this, an exemplary method according to the invention is characterised in that the method comprises at least the following steps:

a. correlating the received signal with each of the possible first sub-modulation codes for obtaining first correlation results and selecting a correlation result;

b. phase-modulating the selected first correlation result with one of said possible second sub-modulation codes for each possible second sub-modulation code for obtaining second correlation results;

c. selecting the maximum second correlation result from the second correlation results;

d. selecting the symbol of the received signal on the basis of a combination the first and second correlating results.

In the exemplary method according to the invention, two main parts of the correlation method can be distinguished. In the first part, the first correlation results are determined and, in the second part, the second correlation results are determined. The second correlation results are obtained by rotating one selected first correlation result to several positions in the complex plane. Since the second part comprises processing of only one selected first correlation result, this yields a reduction in required processing power compared with a situation wherein each first correlation result has to be rotated in the complex plane.

A further embodiment of the method according to the invention is characterised in that, in step a., for each first correlation result, the value of a function of the correlation result is determined and subsequently the first correlation result which provides the maximum value of the function is selected, wherein the function is determined by the type of modulation of the second sub-modulation code. Preferably the function is a function of the real and/or imaginary parts of the first correlation result. The evaluation of this function may require less processing power than conventional functions wherein the length of a complex correlation result is calculated, while still leading the optimal Maximum Likelihood Detection symbol.

In an advantageous embodiment of the method of the invention the number of first modulation results obtained in step a. equals to $C_1 * C_2 * \ldots * C_{i-1} * C_i * C_{i+1} * \ldots * C_n$, wherein $C_i$ is the number of elements of the $i^{th}$ first set of the first sets, and preferably the number of second modulation results obtained in step c. equals the number of predetermined phase modulating elements of the second set.

A further embodiment of the method of the invention is characterised in that in step b in a first substep the selected first correlation result is phase-modulated with each of said possible second sub-modulation codes and in a second substep real values are determined from results obtained in the first substep for obtaining the second correlation results.

In an embodiment according to the invention in step c. a predetermined phase modulating element of the second set is selected which provides the selected second correlation result, and in step d. the predetermined phase modulating elements of the first sets are selected which provide the selected first correlation result. A further embodiment of the method is characterised in that the selected predetermined phase modulating elements of the second set and the predetermined phase modulating elements of the first sets are combined to obtain the symbol of the received signal.

In an advanced embodiment of the method of the invention in step a. a first correlator bank comprising a number of correlators is used, wherein this number of correlators equals the number of first correlation results, and in step b. a second correlator bank is used which comprises a number of correlators, wherein this number of correlators equals the number of second correlation results.

The apparatus according to one embodiment of the invention is characterised in that the apparatus comprises:
a first correlator bank for correlating the received signal with each of the possible first sub-modulation codes for obtaining first correlation results;
first selection means for selecting a first correlation result from the first correlation results;
a second correlator bank for phase-modulating the first correlation result with one of said possible second sub-modulation codes for each possible second sub-modulation code for obtaining second correlation results;
second selection means for selecting the maximum second correlation result from the second correlation results;
a control-unit comprising means for controlling the first selecting means on the basis of the first correlation results;
third selecting means for selecting the symbol of the received signal on the basis of the first and second correlation results.

In a favourable embodiment of the apparatus of the invention the third selection means select a predetermined phase modulating element of the second set which provides the selected second correlation result and also select predetermined phase modulating elements of the first sets which provide the selected first correlation results. Preferably the third selection means of the apparatus of the invention combine the selected predetermined phase modulating element of the second set and the selected predetermined phase modulating elements of the first sets to obtain the symbol in the received signal.

BRIEF DESCRIPTION OF THE DRAWINGS

In the accompanying drawings, in which certain modes of carrying out the present invention are shown for illustrative purposes.

DETAILED DESCRIPTION

Figure 1:
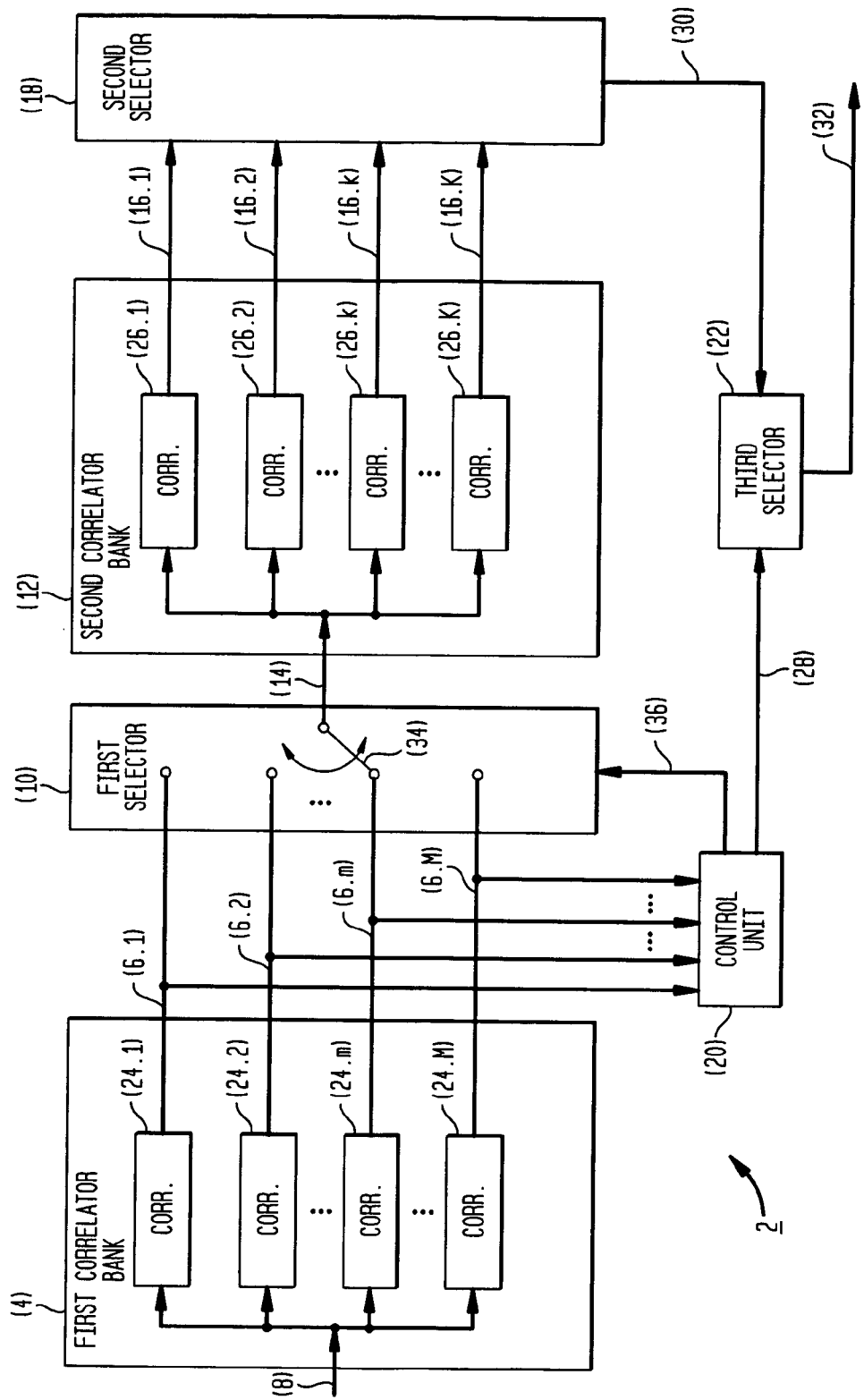
FIG. 1 is diagram schematically showing an embodiment of an apparatus according to the invention for the detection of a symbol from a received signal.

An embodiment of an apparatus 2 for the detection of a symbol from a received signal according to the invention is schematically shown in FIG. 1. The apparatus 2 comprises a first correlator bank 4 for obtaining first correlation results $6.m$ (m=1, 2, ..., M) on the basis of an input signal 8 and first selection means 10 for selecting one of the first correlation results. Furthermore the apparatus 2 comprises a second correlator bank 12 which receives the selected first correlation result 14 and generates second correlation results $16.k$ (k=1, 2, ..., K). The apparatus 2 also comprises second selection means 18 for selecting one of the second correlation results, a control unit 20 for controlling the first selection means 10 and third selection means 22 for selecting the detection symbol. The third selection means 22 select the detection symbol on the basis of the selected first correlation result $6.m$ corresponding to the correlator $24.m$ in the first correlator bank 4 and the selected second correlation result $16.k$ corresponding to the correlator $26.k$ in the second correlator bank 12. The third selection means receives an input signal 28 comprising information about the selected correlator $24.m$ and an input signal 30 comprising information about the selected correlator $26.k$, the output signal 32 comprises information about the detection symbol from the received signal 8. The first selection means 10 comprises a kind of a switch which can connect the output of one correlator of any correlator $24.m$ (m=1, 2, ..., M) to the second correlator bank 12. The switch 34 is controlled with the control signal 36 on the basis of the first correlation results $6.m$ (m=1, 2, ..., M).

The symbol from the received signal 8 is a selected symbol out of a predetermined set of symbols wherein each symbol of the predetermined set is a Complementary Coded Keying symbol (short: CCK-symbol). A CCK-symbol comprises a sequence of chips wherein each of the chips is Phase Shift Keying modulated (short: PSK-modulated). The PSK-modulation is based on a selected modulation code wherein each of the selected modulation codes comprises a first sub-modulation code which is a selection from a plurality of first sets of predetermined phase modulating elements and a second sub-modulation code which is a selection from one second set of predetermined phase modulating elements. At least one of said predetermined phase-modulating elements of the second sets is a complex value.

Figure 2:
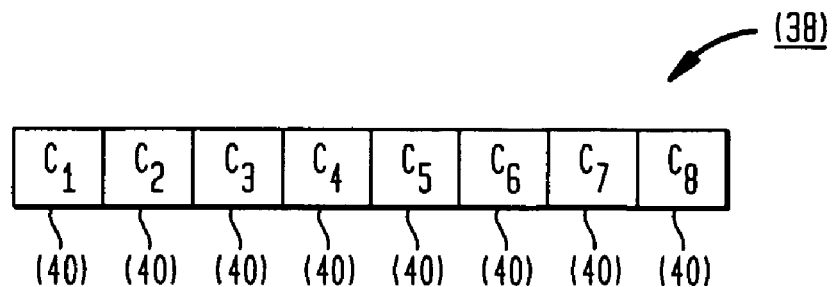
FIG. 2 is a schematic example of a symbol from a received signal.

FIG. 2 presents an example of a symbol 38, out of a predetermined set of symbols, comprising eight chips 40 wherein each chip is phase modulated. This phase modulation is defined with the complex numbers $s_1$ up to $s_8$. With these complex numbers the symbol 38 can be written in vector notation as $s=[s_1, s_2, \ldots, s_8]^T$. An example of a set of high speed CCK-symbols 38 is given in the high speed IEEE 802.11b standard according to:

$$s = [e^{j(\varphi_1+\varphi_2+\varphi_3+\varphi_4)}, e^{j(\varphi_1+\varphi_3+\varphi_4)}, \quad\quad (I)$$
$$e^{j(\varphi_1+\varphi_2+\varphi_4)}, -e^{j(\varphi_1+\varphi_4)}, e^{j(\varphi_1+\varphi_2+\varphi_3)}, e^{j(\varphi_1+\varphi_3)}, -$$
$$e^{j(\varphi_1+\varphi_2)}, e^{j(\varphi_1)}]^T,$$

wherein j is a complex number and wherein the predetermined phase modulating elements $e^{j\phi_1}, e^{j\phi_2}, e^{j\phi_3}, e^{j\phi_4}$ can take on a set of predetermined values. The predetermined phase modulating elements are divided in three first sets and one second set. The three first sets contain the predetermined phase modulating elements $e^{j\phi_2}, e^{j\phi_3}, e^{j\phi_4}$ and the second set contains the predetermined phase modulating element $e^{j\phi_1}$.

The three first sets of predetermined phase modulating elements are respectively defined according to:

$e^{j\phi_2}$, with <.>

$e^{j\phi_3}$, with <<.>>

$e^{j\phi_4}$, with <<<.>>>    (IIA)

wherein $\phi_2, \phi_3, \phi_4$ are the phase parameters of the respective predetermined phase modulating elements. The phase parameters define the possible values of the respective phase modulating elements. The phase parameters can only take on one value out of a limited set of values. For the high speed Ieee 802.11b standard this set is defined according to $$< \varphi_1 \in \{0, \frac{\pi}{2}, -\pi, -\frac{\pi}{2}\} >,$$

$$<< \varphi_2 \in \{0, \frac{\pi}{2}, -\pi, -\frac{\pi}{2}\} >>,$$

$$<< <\varphi_3 \in \{0, \frac{\pi}{2}, -\pi, -\frac{\pi}{2}\} >>>$$

The so-called 5.5 Mbit/s fallback rate corresponds to a different set which set is defined with (IIB):

$$< \varphi_2 \in \{\frac{\pi}{2}, -\frac{\pi}{2}\} >, \quad\quad (IIB)$$

$$<< \varphi_3 \in \{0\} >>,$$

$$<<<, \varphi_4 \in \{0, \pi\} >>>.$$

The predetermined phase modulating element in the second set is defined by:

$e^{j\phi_1}$,    (IIIA)

wherein $\phi_1$ is a phase parameter. The phase parameter $\phi_1$ can take on one value out of the following set of values:

$$\varphi_1 \in \{0, \frac{\pi}{2}, -\pi, -\frac{\pi}{2}\} \quad\quad (IIIB)$$

The modulation code of the symbol (I) is divided into a first sub-modulation code and a second modulation code. The first sub-modulation code s1 is defined in terms of the predetermined phase modulating elements of the first sets according to:

The modulation code of the symbol (I) is divided in a first sub-modulation code and a second modulation code. The first sub-modulation code s1 is defined in terms of the predetermined phase modulating elements of the first sets according to:

$$s1=[e^{j(\phi_2+\phi_3+\phi_4)}, e^{j(\phi_3+\phi_4)}, e^{j(\phi_2+\phi_4)}, -e^{j(\phi_4)}, e^{j(\phi_2+\phi_3)},$$
$$e^{j(\phi_3)}, -e^{j(\phi_2)}, 1]^T, \quad\quad (IV)$$

wherein s1 is an eight-dimensional vector representing one specific value combination out of a set of possible value combinations, which combinations are defined with (IIA, IIB). The number of possible value combinations for the first sub-modulation code equals $C_1 * C_2 * \ldots * C_{i-1} * C_i * C_{i+1} * \ldots * C_n$ wherein $C_i$ is the number of elements of the $i^{th}$ first set of the n first sets. In this example n=3, $C_1=2, C_2=1, C_3=2$ which yields 4 possible value combinations for the first sub-modulation code. In this example the number of first correlators M equals the number of possible value combinations in the first sub-modulation code.

Figure 3:
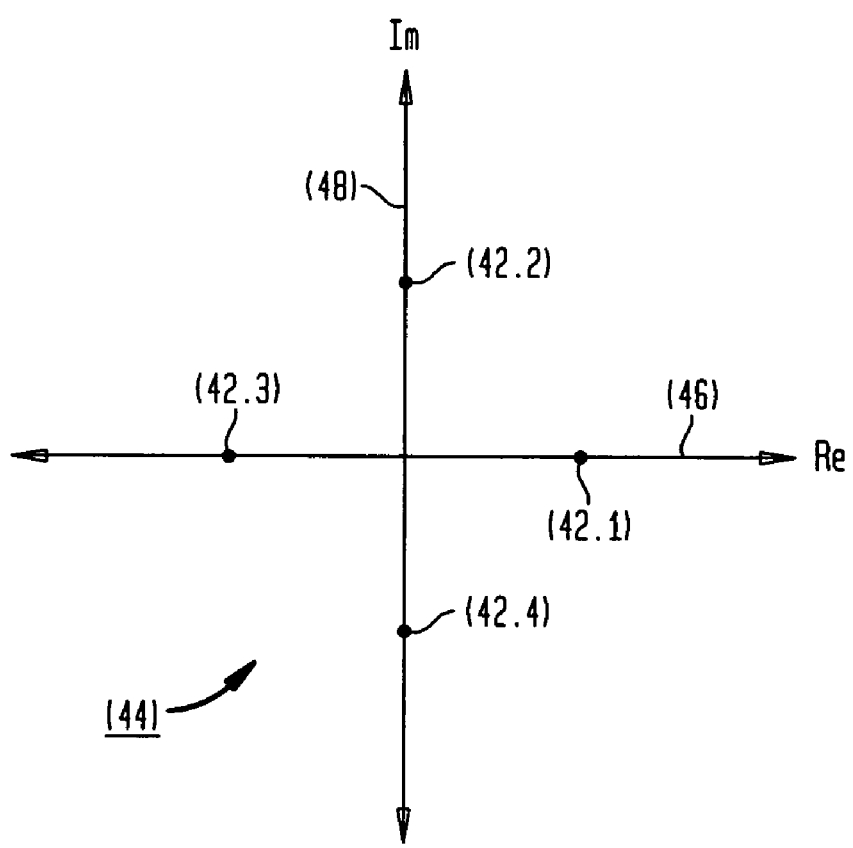
FIG. 3 is a co-ordinate system in the complex plane illustrating a second sub-modulation code for the chips in the symbol of FIG. 2.

The second sub-modulation code s2 is given by:

$$s2=e^{j(\phi_1)}, \quad\quad (V)$$

wherein s2 is one specific value out of the set of possible values for the second sub-modulation code, wherein set is defined with (IIIA, IIIB). These possible values are depicted in FIG. 3. In this figure the values 42.1 up to 42.4 are depicted in the complex co-ordinate system 44 comprising a real axis Re 46 and an imaginary axis Im 48. The second sub-modulation code is a common modulation for all chips of the symbol (I).

It is stressed that the set CCK-symbols (I) as described hereinbefore is just one example. Various sets of symbols can be chosen with different numbers of chips per symbol and different modulation codes. However in the second modulation code always at least one value will be a complex number.

Each of the correlators 24.m (m=1, 2, . . . , M) performs a correlation of the received signal 8 with one of the possible first sub-modulation codes c1 (IV). The number of correlators equals the number of first sub-modulation codes $(=C_1 * C_2 * \ldots * C_{i-1} * C_i * C_{i+1} * \ldots * C_n)$. The correlation is performed as a matched filter, which means that the output signal of the correlator 24.m is given with the complex inner product:

$$Cor_m = \bar{s}1_m \cdot r, \quad\quad (VI)$$

wherein $Cor_m$ is a complex scalar value, $\bar{s}1_m$ is the complex conjugation of the M-dimensional vector $s1_m$, where $s1_m$ is the $m^{th}$ first sub-modulation code of the first sub-modulation codes corresponding to the correlator 24.m, r is the M-dimensional receive signal 8 and $\{\}\cdot\{\}$ is the complex inner product between its arguments. Thus, each of the first correlators 24.m yields a first corelation result 6.m (m=1, 2, . . . , M). These M first correlation results are passed to the control-unit 20. Next, the control-unit determines, for each first correlation result 6.$m$, the value of a function of the correlation result wherein the function is predetermined by the type of modulation of the second sub-modulation code. The type of modulation is defined with (IIIB) and (V). The function is a function of the real and/or imaginary parts of the first correlation result for selecting the value of phase-modulating elements of the first sub-modulation code which are incorporated in the symbol of the received signal. The function firstly leads to the Maximum Likelihood detection symbol and secondly leads to a minimum of necessary processing time. For the chosen type of second sub-modulation (defined with (IIIB) and (V)) this optimal function Crit1 may be given with:

$$Crit1 = Max(|Re(Cor_m)|, |Im(Cor_m)|) \qquad \text{(VII)}$$

wherein the function Max( ) selects the maximum value of its input arguments, the function |( )| yields the absolute value of its input argument, the function Re( ) gives the real part of its complex input argument and the function Im( ) gives the imaginary part of its complex argument. The control-unit 20 subsequently controls the switch 34 in the first selection means 10 on the basis of the maximum value of the function (VII) in such a way that the corresponding first correlation result 6.$m$ is selected by the first selection means 10 and passed to the second correlator-bank 12. Furthermore, the control unit selects the pre-determined phase modulating elements $e^{\hat{\phi}_2}$, $e^{\hat{\phi}_3}$, $e^{\hat{\phi}_4}$ (which correspond to the selected phase parameters $\hat{\phi}_2$, $\hat{\phi}_3$, $\hat{\phi}_4$ belonging to the first sub-modulation code which corresponds to the selected correlator) out of the set (II). A signal 28, comprising this first sub modulation code of correlator 6.$m$, is subsequently passed by the control unit 20 to the third selecting means 22.

The second correlator-bank 12 receives the selected first modulation signal 14 and subsequently performs a phase-modulation on this signal based on the second sub-modulation code (V). Each of the second correlators 26.$k$ ($k=1, \ldots, K$) performs a phase-modulation corresponding to one of the values of the second sub-modulation code c2 from (III) and (V). The result of these phase-modulations are the second correlation results 16.$k$ ($k=1, \ldots, K$). In this example, $K=4$. The second correlation results are passed to the second selection means 18. The selection means 18 selects the pre-determined phase-modulating element $e^{\hat{\phi}_1}$ which corresponds to the second sub-modulation code of the correlator 26.$k$ for which the following function Crit2 is maximum:

$$Crit2 = (Re(Cor_m \cdot c2)), \qquad \text{(VIII)}$$

wherein $Cor_m$ is the selected first correlation result and c2 is the second sub-modulation code from (V). The calculation of the function Crit2 yields the second correlation results. It follows from (VIII) that the number of second correlation results equals the number of possible values of the phase parameter $\phi_1$ of the second set (IIIB). The pre-determined phase-modulating element $e^{\hat{\phi}_1}$ of the second sub modulation code for which Crit2 is maximum is the output signal 30.

The third selection means 22 receives a signal 30 comprising the selected predetermined phase modulating element $e^{\hat{\phi}_1}$ of the second set which yields the selected second sub-modulation result and a signal 28 comprising the selected predetermined phase modulating elements $e^{\hat{\phi}_2}$, $e^{\hat{\phi}_3}$, $e^{\hat{\phi}_4}$ of the first sets which yields the selected first sub-modulation result. On the basis of the signals 28 and 30 and the equation (I) the third selection means 22 can determine the detection symbol:

$$[e^{j(\hat{\phi}_1+\hat{\phi}_2+\hat{\phi}_3+\hat{\phi}_4)}, e^{j(\hat{\phi}_1+\hat{\phi}_3+\hat{\phi}_4)}, e^{j(\hat{\phi}_1+\hat{\phi}_2+\hat{\phi}_4)}, -e^{j(\hat{\phi}_1+\hat{\phi}_4)}, e^{j(\hat{\phi}_1+\hat{\phi}_2+\hat{\phi}_3)}, e^{j(\hat{\phi}_1+\hat{\phi}_3)}, -e^{j(\hat{\phi}_1+\hat{\phi}_2)}, e^{j(\hat{\phi}_1)}]^T \qquad \text{(IX)}$$

from the received signal 8.

The apparatus 2 according to the invention is not limited to the second sub modulation given with (V) for the set of values of the phase parameter $\phi_1$ (IIIB). A variety of types of second sub modulation codes with a corresponding function $Crit_1$ can be used without departing from the scope of the invention. A few number of non-limiting examples are given below.

EXAMPLE 1

The second sub modulation code s2 is defined as:

$$s2 = e^{j(\phi_1)}, \qquad \text{(X)}$$

for which the phase parameter $\phi_1$ can take on the values in the following set:

$$\varphi_1 \in \left\{ \frac{\pi}{4}, \frac{3 \cdot \pi}{4}, \frac{5 \cdot \pi}{4}, \frac{7 \cdot \pi}{4} \right\}, \qquad \text{(XI)}$$

such that the number $K=4$ of second correlators in the second correlator bank 12. The corresponding function Crit1 is given with:

$$Crit1 = |Re(Cor_m)| + |Im(Cor_m)|, \qquad \text{(XII)}$$

wherein $Cor_m$ is the selected first correlation result.

EXAMPLE 2

The second sub modulation code s2 is defined as:

$$s2 = e^{j(\phi_1)}, \qquad \text{(XIII)}$$

for which the phase parameter $\phi_1$ can take on the values in the following set:

$$\varphi_1 \in \left\{ \frac{\pi}{4}, \ldots, \frac{k \cdot \pi}{4}, \frac{(k+1) \cdot \pi}{4}, \ldots, \frac{K \cdot \pi}{4} \right\}, \qquad \text{(XIV)}$$

such that the number $K=8$ of second correlators in the second correlator bank 12. The corresponding function Crit1 is given with:

$$Crit1 = Max\left( |Re(Cor_m)|, |Im(Cor_m)|, \frac{1}{2} \cdot \sqrt{2} \cdot (|Re(Cor_m)| + |Im(Cor_m)|) \right), \qquad \text{(XV)}$$

wherein $Cor_m$ is the selected first correlation result.

EXAMPLE 3

The second sub modulation code s2 is defined as:

$$s2 = e^{j(\phi_1)}, \qquad \text{(XVI)}$$

for which the phase parameter $\phi_1$ can take on the values in the following set:

$$\varphi_1 \in \left\{ \frac{\pi}{8}, \ldots, \frac{k \cdot \pi}{8}, \frac{(k+1) \cdot \pi}{8}, \ldots, \frac{16 \cdot \pi}{8} \right\} \quad \text{(XVII)}$$

such that the the number K=16 of second correlators in the second correlator bank 12 and corresponding function Crit1 is given with:

$$\begin{aligned}
Crit1 = \operatorname{Max}\Bigg( & |\operatorname{Re}(Cor_m)|, |\operatorname{Im}(Cor_m)|, \\
& \frac{1}{2} \cdot \sqrt{2 - \sqrt{2}} \cdot \operatorname{Max}(|\operatorname{Re}(Cor_m)|, |\operatorname{Im}(Cor_m)|) + \\
& \frac{1}{2} \cdot \sqrt{2 - \sqrt{2}} \cdot \operatorname{Min}\Big( |\operatorname{Re}(Cor_m)|, |\operatorname{Im}(Cor_m)|, \\
& \qquad \frac{1}{2} \cdot \sqrt{2} \cdot (|Re(Cor_m)| + |\operatorname{Im}(Cor_m)|) \Big) \Bigg),
\end{aligned} \quad \text{(XVIII)}$$

wherein $Cor_m$ is the selected first correlation result.

In accordance with the provisions of the patent statutes, the present invention has been described in what is considered to represent its preferred embodiments. However, it should be noted that the invention can be practised otherwise than as specifically illustrated and described without departing from its spirit or scope. For example, it is possible to combine in the first and/or the second sub-modulation code a phase modulation with an amplitude modulation.

What is claimed is:

1. A method for the detection of a symbol from a received signal wherein the symbol is a selected symbol out of a predetermined set of symbols, wherein each symbol of the predetermined set is a symbol comprising a sequence of chips wherein each of the chips is phase shift keying modulated according to a selected modulation code wherein each of the selected modulation codes comprises a first sub-modulation code which is a selection from a plurality of first sets of predetermined phase modulating elements and a second sub-modulation code which is a selection from one second set of predetermined phase modulating elements wherein at least one of the predetermined phase modulating elements of the second set is a complex value, the method comprising:
   a. correlating the received signal with each of the possible first sub-modulation codes for obtaining first correlation results and selecting a first correlation result;
   b. phase-modulating the selected first correlation result with one of the possible second sub-modulation codes for each possible second sub-modulation code for obtaining second correlation results;
   c. selecting a maximum second correlation result from the second correlation results;
   d. selecting the symbol of the received signal based on the selected first correlation result and the selected maximum second correlation result.

2. A method according to claim 1, wherein for each first correlation result the value of a function of the correlation result is determined and subsequently the first correlation result which provides the maximum value of the function is selected wherein the function is determined by the type of modulation of the second sub-modulation code.

3. A method according to claim 2, wherein the function is a function of the real and/or imaginary parts of the first correlation result.

4. A method according to claim 1, wherein the number of first modulation results obtained in step a. equals $C_1 * C_2 * \ldots * C_{i-1} * C_i * C_{i+1} * \ldots * C_n$ wherein $C_i$ is the number of elements of the $i^{th}$ first set of the first sets.

5. A method according to claim 1, wherein in step b. in a first substep the selected first correlation result is phase-modulated with each of the possible second sub-modulation codes and in a second substep real values are determined from results obtained in the first substep for obtaining the second correlation results.

6. A method according to claim 1, wherein the number of second modulation results obtained in step b. equals the number of predetermined phase modulating elements of the second set.

7. A method according to claim 1, wherein in step c. a predetermined phase modulating element of the second set is selected which provides the selected second correlation result.

8. A method according to claim 1, wherein in step a. the predetermined phase modulating elements of the first sets are selected which provides the selected first correlation result.

9. A method according to claim 1, wherein selected predetermined phase modulating elements of the first sets are combined with a selected predetermined phase modulating element of the second set to obtain the symbol in the received signal.

10. A method according to claim 1, wherein in step a. a first correlator bank comprising a number of correlators is used, wherein this number of correlators equals the number of first correlation results.

11. A method according to claim 1, wherein in step b. a second correlator bank comprising a number of correlators is used, wherein this number of correlators equals the number of second correlation results.

12. An apparatus for the detection of a symbol from a received signal wherein the symbol is a selected symbol out of a predetermined set of symbols, wherein each symbol of the predetermined set is a symbol comprising a sequence of chips wherein each of the chips is phase shift keying modulated according to a selected modulation code wherein each of the selected modulation codes comprises a first sub-modulation code which is a selection from a plurality of first sets of predetermined phase modulating elements and a second sub-modulation code which is a selection from one second set of predetermined phase modulating elements wherein at least one of said predetermined phase modulating elements of said second set is a complex value, the apparatus comprising:
   a first correlator bank for correlating the received signal with each of the possible first sub-modulation codes for obtaining first correlation results;
   a first selector for selecting a first correlation result from the first correlation results;
   a second correlator bank for phase-modulating the first correlation result with one of said possible second sub-modulation codes for each possible second sub-modulation code for obtaining second correlation results;
   a second selector for selecting a maximum second correlation result from the second correlation results;
   a control-unit that controls the first selector on the basis of the first correlation results; and a third selector for selecting the symbol of the received signal on the basis of the selected first correlation result and the selected maximum second correlation result.

13. An apparatus according to claim 12, wherein the control-unit determines for each first correlation result the value of a function of the correlation result, wherein the function is determined by a type of modulation of the second sub-modulation code, and subsequently controls the first selector on the basis of a maximum value of the function in such a way that the corresponding first correlation result is selected by the first selector and passed to the second correlator-bank.

14. An apparatus according to claim 13, wherein the function is a function of the real and/or imaginary parts of the first correlation result.

15. An apparatus according to claim 12, wherein the number of first correlation results obtained by the first correlator-bank equals $C_1*C_2* \ldots *C_{i-1}*C_i*C_{i+1}* \ldots *C_n$ wherein $C_1$ is the number of elements of the $i^{th}$ first set of the first sets.

16. An apparatus according to claim 12, wherein the second correlator-bank comprises means for phase-modulating the selected first correlation result with each of said possible second sub-modulation codes for obtaining phase modulation results and also comprises means for determining real values of the obtained phase-modulated results for obtaining the second correlation results.

17. An apparatus according to claim 12, wherein the number of second correlation results equals the number of predetermined phase modulating elements of the second set.

18. An apparatus according to claim 12, wherein the second selector selects a predetermined phase modulating element of the second set which provides the selected second correlation result.

19. An apparatus according to claim 12, wherein the first selector selects predetermined phase modulating elements of the first sets which provides the selected first correlation result.

20. An apparatus according to claim 12, wherein the third selector combines a selected predetermined phase modulating element of the second set and selected predetermined phase modulating elements of the first sets to obtain the symbol of the received signal.

21. A method according to claim 1, wherein each symbol of the predetermined set is a CCK symbol.

22. An apparatus according to claim 12, wherein each symbol of the predetermined set is a CCK symbol.

23. A method according to claim 1, wherein:
for each first correlation result the value of a function of the correlation result is determined and subsequently the first correlation result which provides the maximum value of the function is selected wherein the function is determined by the type of modulation of the second sub-modulation code, wherein the function is a function of the real and/or imaginary parts of the first correlation result;
the number of first modulation results obtained in step a. equals $C_1*C_2* \ldots *C_{i-1}*C_i*C_{i+1}* \ldots *C_n$ wherein $C_i$ is the number of elements of the $i^{th}$ first set of the first sets;

in step a. the predetermined phase modulating elements of the first sets are selected which provides the selected first correlation result;
in step b. in a first substep the selected first correlation result is phase-modulated with each of the possible second sub-modulation codes and in a second substep real values are determined from results obtained in the first substep for obtaining the second correlation results;
in step c. a predetermined phase modulating element of the second set is selected which provides the selected second correlation result;
selected predetermined phase modulating elements of the first sets are combined with a selected predetermined phase modulating element of the second set to obtain the symbol in the received signal
in step a. a first correlator bank comprising a number of correlators is used, wherein this number of correlators equals the number of first correlation results;
in step b. a second correlator bank comprising a number of correlators is used, wherein this number of correlators equals the number of second correlation results; and
each symbol of the predetermined set is a CCK symbol.

24. An apparatus according to claim 12, wherein:
the control-unit determines for each first correlation result the value of a function of the correlation result, wherein the function is determined by a type of modulation of the second sub-modulation code, and subsequently controls the first selector on the basis of a maximum value of the function in such a way that the corresponding first correlation result is selected by the first selector and passed to the second correlator-bank, wherein the function is a function of the real and/or imaginary parts of the first correlation result;
the number of first correlation results obtained by the first correlator-bank equals $C_1*C_2* \ldots *C_{i-1}*C_i*C_{i+1}* \ldots *C_n$ wherein $C_i$ is the number of elements of the $i^{th}$ first set of the first sets;
the second correlator-bank comprises means for phase-modulating the selected first correlation result with each of said possible second sub-modulation codes for obtaining phase modulation results and also comprises means for determining real values of the obtained phase-modulated results for obtaining the second correlation results;
the first selector selects predetermined phase modulating elements of the first sets which provides the selected first correlation result;
the second selector selects a predetermined phase modulating element of the second set which provides the selected second correlation result;
the third selector combines a selected predetermined phase modulating element of the second set and selected predetermined phase modulating elements of the first sets to obtain the symbol of the received signal; and
each symbol of the predetermined set is a CCK symbol.

* * * * *